July 12, 1966  C. VILLENEUVE  3,260,836
AIR HEATING FURNACE
Filed May 25, 1964
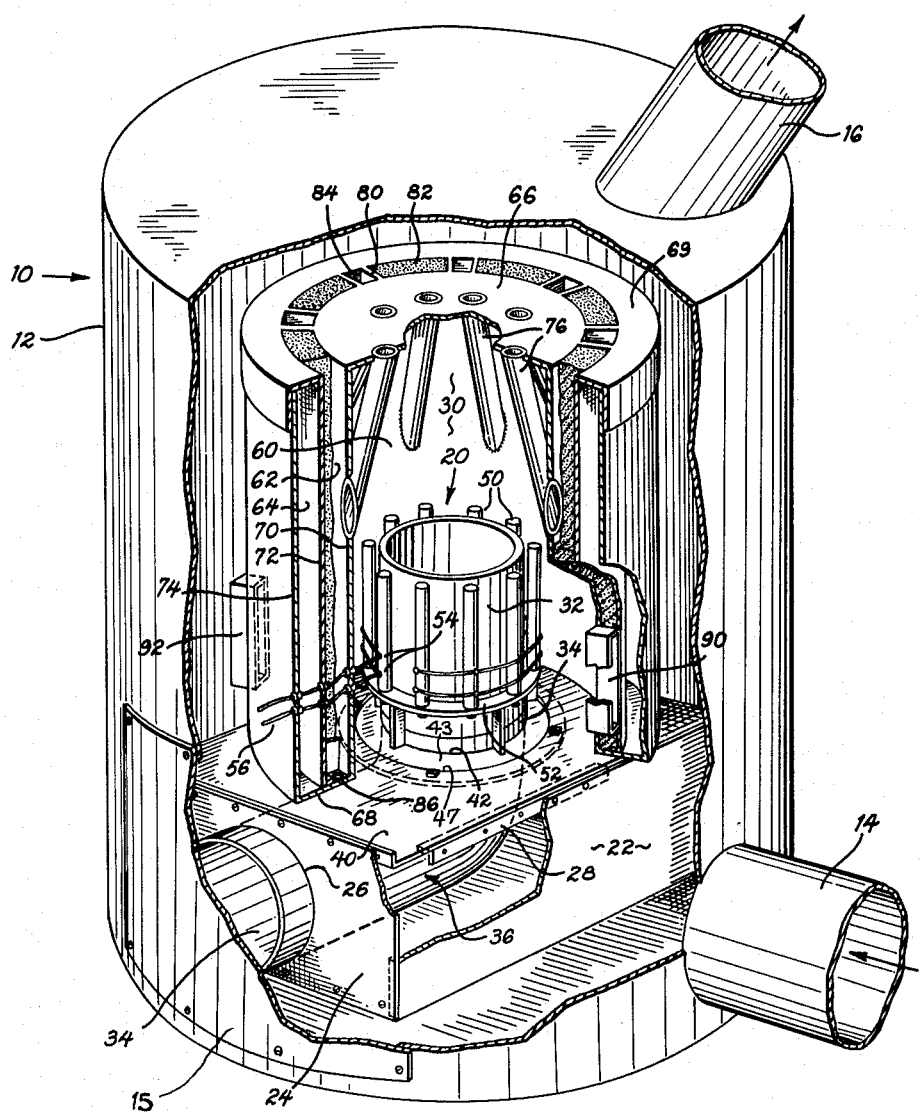
INVENTOR
CAMILLE VILLENEUVE
BY Featherstonhaugh & Co.
ATTORNEYS.

United States Patent Office 3,260,836
Patented July 12, 1966

3,260,836
AIR HEATING FURNACE
Camille Villeneuve, 242 Dunraven Drive,
Toronto, Ontario, Canada
Filed May 25, 1964, Ser. No. 369,882
Claims priority, application Canada, July 3, 1963,
879,225
2 Claims. (Cl. 219—365)

This invention relates to a heating furnace such as those employed in the heating of homes and offices. This furnace is particularly suited to the use of electrical power as the source of heating energy.

The use of electricity in the heating of houses is becoming increasingly popular with the general public and as a result a substantial number of new houses are being constructed with "built-in" electrical heating. As a result of the general acceptance of electricity for domestic heating purposes a considerable interest has arisen in the adaption of existing heating systems to employ electricity as the source of heating energy. In most instances electricity is required for the successful operation of an oil or gas fired furnace. There is therefore a ready source of electricity available. The public in general however are reluctant to scrap their existing equipment as the cost and inconvenience of installing heating equipment of the type employed in the construction of new buildings is too great to interest the average householder.

To the best of my knowledge no heating furnace employing electricity as a source of heating energy has yet been developed which will operate along similar lines to and compete economically with the normal oil or gas fired furnace. In the course of my experiences I have found that coarse sand is a particularly suitable material for outdoor cooking purposes due to its ability to retain heat. It occurred to me, therefore, that if a quantity of sand were heated and allowed to cool, the sand would give up its heat gradually and if this heat were given up to the air circulating through a building then the result would be a very gradual variation in the temperature of the circulating air. As one of the major drawbacks to electrical heating is the very rapid cooling of the electrical heating element, my attention was naturally focussed on electrical heating appliances. It should however, be clearly understood that this invention is not limited to the use of electricity as the source of heating energy as the same basic principle may easily be adapted to suit oil or gas fired appliances. By providing a furnace unit which may be adapted to replace an existing furnace employing the hot air circulating system I am able to reduce the cost of conversion from oil or gas to electricity and, furthermore, by providing a heat retaining medium I am able to obtain an extremely stable temperature throughout the area being heated without circulating blasts of hot air at a temperature considerably higher than the control temperature required.

This invention relates to a heating furnace comprising heat retaining means having a core of refractory material for retaining heat, heating means for heating said heat retaining means and passage means for circulating the fluid to be heated in close proximity to said heat retaining means.

The invention will be clearly understood after reference to the following detailed specification read in conjunction with the drawings.

In the drawings:

The figure is a perspective view partially sectioned to show the interior construction details.

The reference numeral 10 refers generally to the furnace unit as a whole. An outer casing 12 encloses the main heating unit 20 thereby permitting the furnace unit as a whole to operate on the closed circuit principle, cool air from the space being heated entering the outer casing 12 through air inlet port 14 situated towards the lower end of said outer casing 12 and heated air leaving the outer casing 12 through the air outlet port 16 located in the upper portion of said outer casing 12. An access door 15 is provided in the wall of said casing 12. The trunking and venting employed in conjunction with the heating furnace according to the present invention is standard equipment well known in the field of oil and gas fired air heating units and it is not therefore my intention to relate the details of the air circulation throughout a building.

The main heating unit 20 comprises an upper heat exchange chamber 30 and a lower base portion 22. Said lower base portion is provided with a removable access door 24 which is bolted to the main structure of said base portion. Support brackets 28 are located within and adjacent the upper edge of opposite sides of said base portion 22 and serve to support a retainer plate 40, said retainer plate 40 having an aperture 47 located co-axially with said upper heat exchange chamber 30. A removable location ring 43 is removably located on the underside of the retainer plate 40 and is provided with an aperture 42 which is located co-axially with respect to said upper heat exchange chamber. A hollow trunking member 36 enters the base portion 22 and extends upwardly within and is located co-axially with respect to said heat exchange chamber 30. Said hollow trunking member 36 comprises an upper portion 32 and a lower portion 34. The lower portion 34 is substantially L-shaped and is located at opposite ends within the apertures 26 and 42.

A plurality of heating elements 50 are carried by, electrically insulated from and extend vertically upward from a support ring 52, said elements being electrically connected in series. Said support ring 52 is carried by location ring 43 and located such that said electrical heating elements 50 are spaced from and extend upwardly substantially parallel to said upper portion 32 of the hollow trunking member 36. Electrical terminals 54 connect said heating elements 50 with a source of electrical supply through power supply wires 56, said heating element being thermostatically controlled in the normal manner.

The upper chamber 30 comprises an inner chamber 60, an intermediate chamber 62 and an outer chamber 64, peripherally defined by cylindrical walls 70, 72 and 74, respectively. The upper end of chamber 60 is closed by top plate 69. The lower ends of intermediate chamber 62 and outer chamber 64 are closed by means of end closure plate 68, the upper end of said intermediate chamber 62 being open whereas the upper end of said outer chamber 64 is closed by means of closure ring 69. All joints between interconnected plates are welded.

A plurality of webs 80 are located within and extend the full length of said intermediate chamber and are spaced so as to provide large cells 82 and small cells 84 alternately around said intermediate chamber. Vent holes 86 are provided in the closure plate 68 and open into said small cells 84 to permit free circulation of air.

Hollow tubes 76 extend downwardly and outwardly from the top plate 66 to meet the wall 70 such that the top ends of said hollow tubes are open and the lower ends thereof open into said large cells 82 formed in said intermediate chamber 62. The large cells 82 and the hollow tubes 76 are filled with a heat-retaining medium such as coarse washed sand. A passageway 90 opens from said inner chamber 60 into said outer chamber 64, said passageway 90 passing through one of said large cells 82 of said intermediate chamber 62. A port 92 located diagonally opposite said first passageway 90 opens from said outer chamber into the space enclosed by the outer casing 12.

In use, when the heating elements are switched on, air enters the outer casing 12 through the inlet port 14 and thence into the inner chamber 60 of said main heating unit 20 by way of said hollow trunking member 36. Air heated by the elements rises and is trapped in the upper portion of said inner chamber. This heated air gives up heat to the sand filled tubes 76 and to the sand-filled cells 82. Heated air leaves the inner chamber through the passageway 90 and into the outer chamber 64 and thence around the outer chamber to exit through port 92 into the upper portion of said outer casing 12. It will be understood that during the time that the heating elements are in operation heat will be given up to the sand by the heated air and by radiation from the heating elements, whereas, during the period when the heating elements are switched off heat will be given up by the sand to the air circulating through the heating unit.

Air circulation may be natural draught or forced draught, but I have found that as warm air is continuously circulating I am able to use a natural draught system very successfully in circumstances which would normally call for a forced draught system. It would, however, be a very simple modification to provide the invention according to the present invention with a forced draught heating system.

What I claim as my invention is:

1. An air heating furnace comprising, an inner chamber, heating means located within said inner chamber and disposed to permit the air contained within said inner chamber to circulate in intimate contact therewith to provide rapid heating of said air when said heating means is activated, an intermediate heat retaining chamber surrounding and in heat receiving relation to said inner chamber, heat retaining means contained within said intermediate chamber, said heat retaining means receiving heat from said heating means and the circulating air when said heating means is activated and giving up heat to said circulating air when said heating means is not activated, an outer chamber surrounding and in heat receiving relation to said intermediate chamber, a first passage to permit air to enter said inner chamber, passage means for circulating said air in close proximity to said intermediate heat retaining chamber, said passage means including a second passage extending through said intermediate chamber to permit air to pass out of said inner chamber into said outer chamber, said outer chamber forming a third passage for circulating said air in intimate contact with said heat retaining chamber, outlet means opening from said outer chamber to permit heated air to pass from the furnace.

2. A heating furnace as claimed in claim 1 wherein said heating means comprises a plurality of electrical heating elements disposed around said first passage to provide rapid heating of the air entering the inner chamber.

References Cited by the Examiner

UNITED STATES PATENTS

| 134,879 | 1/1873 | Geddes | 126—106 |
| 2,212,534 | 8/1940 | Arnold | 126—106 |
| 2,462,395 | 2/1949 | Heiman | 126—106 |

FOREIGN PATENTS

| 647,114 | 7/1928 | France. | |

JAMES W. WESTHAVER, *Primary Examiner.*